(12) United States Patent
Daugy et al.

(10) Patent No.: US 6,467,607 B1
(45) Date of Patent: Oct. 22, 2002

(54) SEAL GROMMET FEEDER FOR A HARNESS MAKING MACHINE

(75) Inventors: Bruno Daugy, St. Maximin; Jean Paul Celoudoux, Aix en Provence, both of (FR)

(73) Assignee: Komax Holding AG, Dierikon (CH)

( * ) Notice: Subject to any disclaimer, the term of this patent is extended or adjusted under 35 U.S.C. 154(b) by 102 days.

(21) Appl. No.: 09/714,475

(22) Filed: Nov. 16, 2000

(30) Foreign Application Priority Data

Nov. 18, 1999 (EP) .............................. 99811066

(51) Int. Cl.[7] .............................. B65G 47/24
(52) U.S. Cl. ...................... 198/380; 198/398
(58) Field of Search .................. 198/380, 398

(56) References Cited

U.S. PATENT DOCUMENTS

| | | | |
|---|---|---|---|
| 4,172,513 A | * 10/1979 | Bradstreet et al. | 198/380 |
| 4,282,964 A | 8/1981 | Hogenkamp et al. | |
| 5,155,895 A | 10/1992 | Jakiela et al. | |
| 5,913,428 A | * 6/1999 | Graham | 198/380 |
| 5,926,947 A | 7/1999 | Takano et al. | |

FOREIGN PATENT DOCUMENTS

WO    WO 97/08787    3/1997

* cited by examiner

Primary Examiner—Joseph E. Valenza
(74) Attorney, Agent, or Firm—Cohen, Pontani, Lieberman & Pavane

(57) ABSTRACT

A seal grommet feeding device having a feeding track that advances seal grommets along a groove in the feed track by vibration of the feed track. Grommets are randomly dropped on an end portion of the feed track, some of the grommets orienting correctly in the feed track groove whereas certain grommets may be incorrectly oriented. Incorrectly oriented seal grommets are blown off the feed track by compressed air through a nozzle alongside the feed track. Substantially opposite the nozzle, an upper retention shoulder is provided for abutting an upper end of a correctly oriented seal grommet such that correctly oriented seal grommets are blown off the feed track. This is particularly advantageous when higher feeding speeds are required or where seal grommets are particularly top heavy.

1 Claim, 2 Drawing Sheets

US 6,467,607 B1

SEAL GROMMET FEEDER FOR A HARNESS MAKING MACHINE

BACKGROUND OF THE INVENTION

1. Field of the Invention

The present invention relates to a seal grommet feeder of a seal processing station of a harness making machine.

2. Description of the Related Art

A seal processing station of a harness making machine is described in International application WO 9708787. In this application a seal processing station for a harness making machine is shown comprising a seal sorting and feeding unit that feeds single wire seal grommets on a feed track which carries the seal grommets to an insertion device. The insertion device positions the seal grommets over the end of an electrical or optical wire for the purpose of sealing the wire end, which may be terminated to a terminal, in a connector housing. The feed track is mounted on a vibrator unit, which vibrates so that the grommets are fed from the seal sorting unit to the insertion device along the feed track. The feed track has a groove within which a narrow portion of the grommet is received so that the central axis of the grommet (i.e., the axis at the center of the hole extending through the grommet) is substantially perpendicular to the direction of the feed track. Single wire grommets typically have one or more radial sealing lips of a greater diameter than the narrow portion received in the groove of the feed track.

In order to position the grommets on the vibrating feed track, such that the smaller end inserts into the groove of the feed track and the grommet is oriented with its axis of a rotation perpendicular to the feed track direction, grommets are randomly dropped on the vibrating feed track whereby some grommets fall off, some grommets orient themselves correctly in the groove of the feed track and others remain on the feed track incorrectly oriented. In order to feed only correctly oriented grommets on the feed track at or proximate the exit of the feed track from the seal sorting unit, a jet of air is blown across the feed track through a nozzle arranged adjacent the feed track above the groove. The jet of air blows off incorrectly oriented grommets.

The air pressure of the nozzle must be finely tuned in order to ensure that the air pressure is sufficient to blow off all incorrectly oriented grommets, but not any correctly oriented grommets. The sensitivity of adjustment increases with grommet shapes that are "top-heavy".

SUMMARY OF THE INVENTION

The inventor of the present invention described hereinafter, realized that the problem of blowing correctly oriented seals off the feed track increases with higher feed rates, and may even become the limiting factor in reducing cycle times of harness making machines.

Accordingly, it is an object of the present invention to provide a reliable grommet feeding device that can operate at high speed and with a variety of different grommet designs, some of which may be particularly top heavy.

Pursuant to this object, and others which will become apparent hereafter, one aspect of the present invention resides in a seal grommet feeding device for feeding seal grommets having a substantially axisymmetric shape extending along a center axis between first and second ends, the feeding device comprising a feed track having a groove for receiving the first end of the grommet therein. The device further comprises an air propulsion member that blows a jet of air across the feed track for removing incorrectly oriented seal grommets off the feed track. Substantially at the position of the air jet with respect to the direction along the feed tack, the device comprises a retention shoulder against which the second end of the seal grommet abuts. The retention shoulder is positioned above the feed track with a spacing sufficient to allow passage of incorrectly oriented seal grommets therethrough. Thus, correctly oriented grommets, even particularly top heavy ones, are not blown off the feed track due to engagement of the upper ends thereof against the retention shoulder, whereas incorrectly oriented seal grommets are blown through the spacing beneath the retention shoulder. The air propulsion device may comprise a nozzle provided in an extension of one side wall of the feed track. The nozzle may be positioned between the top of the feed track groove and the retention shoulder such that the air jet blows into the space therebetween.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

An embodiment of this invention will now be described by way of example with reference to the figures in which.

DETAILED DESCRIPTION OF THE PREFERRED EMBODIMENTS

Figure 1:
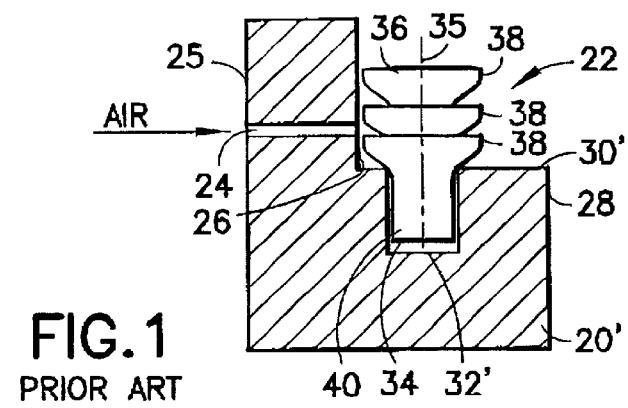
FIG. 1 is a cross-section of part of a conventional seal grommet feeding device showing a seal grommet correctly oriented on a feed track.
Figure 2:
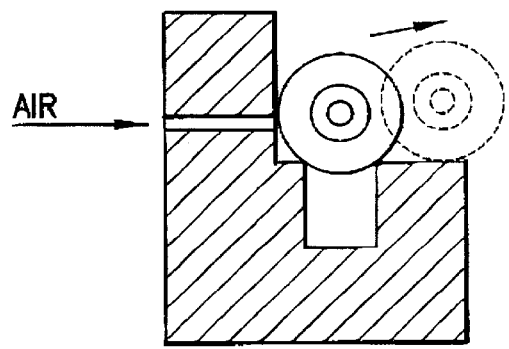
FIG. 2 is a view similar to FIG. 1 showing a seal grommet incorrectly oriented on the feed track.

Referring to FIGS. 1 and 2, a cross-section through part of a seal grommet feeding device is shown. The device comprises a feed track 20' that is mounted on a vibrator that oscillates the feed track 20' in such a manner as to feed seal grommets 22 therealong from a seal sorting unit to an assembly or insertion apparatus for mounting the seal grommet on a wire end. These elements are well known in the art and are for example described in International application WO 9708787. The feed track 20' is provided with an air jet system which in this embodiment comprises one or more nozzles 24 connected at an outer end 25' to a compressed air source for blowing a jet of air across the feed track 20' from one side 26 thereof towards an opposite side 28. The nozzle 24 is positioned at a certain height above the top surface 30' of the feed track 20' such that grommets 22 fed therepast intersect the air jet. The feed track 20' is further provided with a groove 32' recessed from the top wall or surface 30' and receives a first end 34 of the grommets 22 therein.

Grommets may have various shapes and sizes, but typically have an axisymmetric (or revolution) shape about a central axis 35, extending from the first end 34 to a second end 36 and comprising a plurality of radial sealing lips 38 proximate second end 36 and a smaller diameter portion 40 proximate the first end 34. The seal grommet is further provided with a central bore for receiving a wire therethrough in the direction of the axis 35. The groove 32' of the sealing track 20' is adapted to receive the narrow diameter portion 40 proximate the first end 34 of the grommet therein.

As is known in prior sealing sorting units, seal grommets 22 are randomly dropped on a portion of the vibrator feed track 20', whereby certain grommets fall off, others orient themselves correctly on the feed track (i.e., with their first ends 34 in the groove 32' and the axis 35 substantially perpendicular to the feed track direction) whereas some grommets may be incorrectly oriented (for example upside-down with relation to the orientation of FIG. 1 or laying on their sides as illustrated in FIG. 2). In prior systems, as the grommets pass the air jet, incorrectly oriented grommets are toppled or blown off the feed track 20' as illustrated in FIG. 2. Correctly oriented grommets as shown in FIG. 1 are normally held in the feed track 20' by engagement of the first end 34 in the groove 32'. The pressure of the air however has to be tuned very accurately in order to prevent correctly oriented grommets 22 from being blown off. The problem is worsened with grommets that are top heavy, in that there are many radial sealing lips that extend high above the narrow first end portion 40, or are of a diameter much larger than the narrow portion.

As the feed rate increases in order to reduce cycle times of the harness making machine, the vibration of the feed track is enhanced thereby making the seals jump along the feed track in a more pronounced manner, which increases the chances of correctly oriented seal grommets from being blown off the feed track. This effect, which has been recognized by the inventor, can be very disadvantageous as the speed of the harness making machine may be limited.

Figure 3:
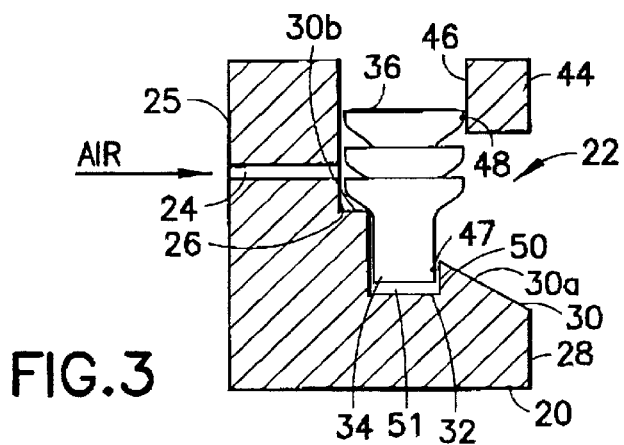
FIG. 3 is a cross-sectional view through part of a seal grommet feeding device according to the present invention, showing a seal grommet positioned in a feeding track thereof in the correct orientation.
Figure 4:
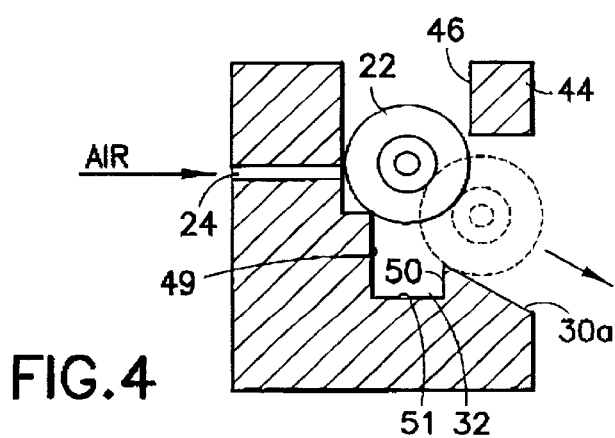
FIG. 4 is a cross-sectional view similar to FIG. 3 showing a seal grommet incorrectly oriented on the feeding track.
Figure 5:
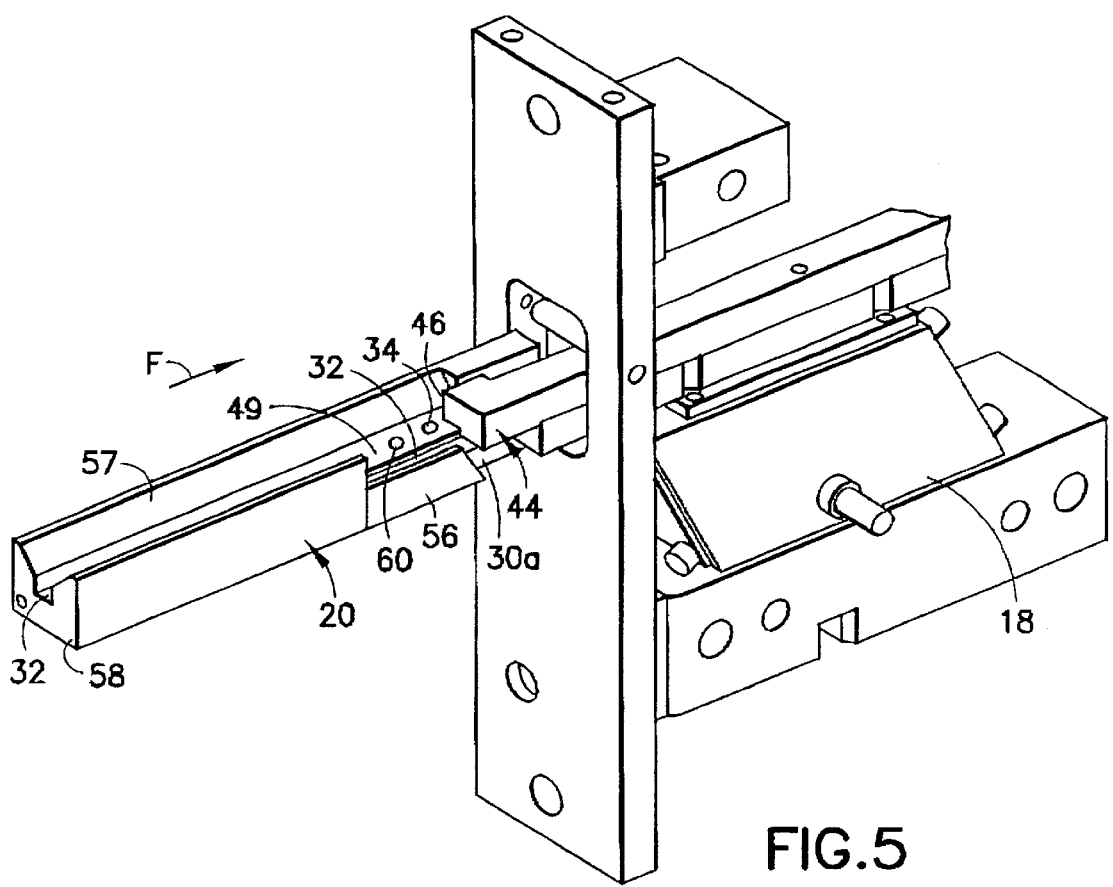
FIG. 5 is a perspective view of a portion of a grommet feeding device according to the invention.

Referring to FIGS. 3, 4, and 5, cross-sections and a perspective view of a grommet feeding device according to this invention are shown whereby in FIG. 3 the seal grommet 22 is shown correctly oriented and in FIG. 4 the seal grommet is incorrectly oriented on the feed track 20.

In FIG. 5 a portion of the feed track 20 is shown in perspective, the feed track being mounted on a vibrator 18 and projecting into a seal sorting unit at an end 58. As best seen in FIG. 4, an incorrectly oriented grommet 22 is ejected by the air jets through the space between the recessed top wall 30a portion and a retention member 44. The seal grommet in these figures has the same characteristics as the previously described seal grommet and will not be described again. The air propulsion system may be substantially similar to a conventional air propulsion system with a nozzle 24 that receives compressed air therethrough and feeds it from one side 26 towards an opposed side 28 of the feed track 20. The nozzle 24 is similarly positioned at a certain height above a top wall 30 of the feed track. Similarly a groove 32 is recessed from the top wall 30 and receives the first end 34 of the grommet therein.

The grommet feeding device according to this invention further comprises a retaining wall 44 on the side 28 of the feed track opposite the nozzle 24, thereby providing a retention shoulder 46 against which the seal grommet 22 proximate the second end 36 abuts. A correctly oriented seal grommet as shown in FIG. 3 is thus supported at first and second radial points 47, 48 proximate the first and second ends 34, 36 respectively, against a side wall 50 of the grove 32 and the retention shoulder 46 respectively. The groove also has a side wall 49 opposite the side wall 50. A higher pressure air jet, in comparison to prior solutions, can thus be provided, or with a lesser requirement for fine tuning, in addition to the ability to vibrate the feed track at higher frequency and amplitude in order to increase the feed rate of the grommets therealong. The upper surface 30 of the feed track 20 along a portion where the retention shoulder 46 is provided, is at a reduced height above the bottom wall 51 of the groove 32 with respect to the upper wall portion 30b at the other side 26 where the nozzle 24 is provided, to provide a large passage for ejecting grommets.

It may be seen in FIG. 5 that along the feed track 20 adjacent the retention member 44 there is a lower top wall portion 56, and which is higher than the top wall portion 30a beneath the retention shoulder 36, which serves to allow surplus grommets to fall off the feed track that projects into the seal sorting unit has a funnel or tapered top surface 57 for capturing seal grommets that are dropped thereon. A further nozzle 60 for receiving compressed air may be provided opposite the recessed portion 56 to blow off the surplus grommets, for example with lower pressure than air through the first nozzle 24.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A seal grommet feeding device for feeding seal grommets having a shape extending along a center axis between first and second ends, the feeding device comprising: a feed track having a groove for receiving the first end of the seal grommet; an air propulsion member arranged to direct a jet of air across the feed track so as to remove incorrectly oriented seal grommets off the feed track; and a retention shoulder for abutment of a second end of the seal grommet thereagainst, the retention shoulder being positioned substantially at a position of the air propulsion member with respect to the direction along the feed track and above the feed track groove with a spacing sufficient to allow passage of incorrectly oriented seal grommets therethrough.

* * * * *